(12) United States Patent
Tomassi et al.

(10) Patent No.: US 9,725,935 B2
(45) Date of Patent: Aug. 8, 2017

(54) SAFETY STOP FOR A SLIDING DOOR OR WINDOW

(71) Applicants: Robert Tomassi, Levittown, PA (US); Sara Tomassi, Levittown, PA (US)

(72) Inventors: Robert Tomassi, Levittown, PA (US); Sara Tomassi, Levittown, PA (US)

(*) Notice: Subject to any disclaimer, the term of this patent is extended or adjusted under 35 U.S.C. 154(b) by 0 days.

(21) Appl. No.: 15/260,285

(22) Filed: Sep. 8, 2016

(65) Prior Publication Data

US 2017/0067275 A1    Mar. 9, 2017

Related U.S. Application Data

(60) Provisional application No. 62/215,702, filed on Sep. 8, 2015.

(51) Int. Cl.
| | |
|---|---|
| E05C 19/00 | (2006.01) |
| E05B 65/08 | (2006.01) |
| E05C 17/54 | (2006.01) |
| F16B 47/00 | (2006.01) |

(52) U.S. Cl.
CPC .......... *E05C 19/00* (2013.01); *E05B 65/0894* (2013.01); *E05C 17/54* (2013.01); *F16B 47/006* (2013.01); *Y10T 16/61* (2015.01)

(58) Field of Classification Search
CPC ......... Y10T 16/61; Y10T 16/27; E05C 19/00; E05C 17/54; E05C 17/525; E05B 65/0894; F16B 47/006; E05F 5/003; E05Y 2201/224; E05Y 2900/132; E05Y 2900/148

USPC ............... 16/82, 49; 292/339, 343, DIG. 19, 292/DIG. 28; 248/467, 205.7
See application file for complete search history.

(56) References Cited

U.S. PATENT DOCUMENTS

| | | | |
|---|---|---|---|
| 3,059,952 A | 10/1962 | Wittman et al. | |
| 5,552,768 A | 9/1996 | Mikiel et al. | |
| 5,734,324 A | 3/1998 | James | |
| 6,497,004 B1* | 12/2002 | Armstrong | ............ E05C 17/525 |
| | | | 16/66 |
| 6,778,086 B2 | 8/2004 | Morrone et al. | |
| 2006/0288527 A1* | 12/2006 | Van Vliet | ............... E05C 17/525 |
| | | | 16/82 |
| 2014/0009288 A1 | 1/2014 | Kersch et al. | |
| 2016/0340948 A1* | 11/2016 | McCullough | ......... E05C 19/188 |

\* cited by examiner

*Primary Examiner* — William Miller
(74) *Attorney, Agent, or Firm* — LaMorte & Associates, P.C.

(57) ABSTRACT

A safety stop device for limiting the movement of a window or sliding door that is fitted with a glass pane. The safety stop has a housing with a top plate. The top plate is flat. Support walls extend from the top plate and terminate in a common plane. A protected area is defined between the support walls and under the top plate. A suction cup is disposed within the protected area. A suction control assembly is coupled to the top plate. The suction control assembly selectively controls air pressure within the suction cup when the suction cup is engaged with the glass pane.

20 Claims, 8 Drawing Sheets

SAFETY STOP FOR A SLIDING DOOR OR WINDOW

RELATED APPLICATIONS

This application claims the priority of provisional patent application No. 62/215,702, filed Sep. 8, 2015.

BACKGROUND OF THE INVENTION

1. Field of the Invention

In general, the present invention relates to safety stops that prevent a child from inadvertently opening a sliding door or window sash. More particularly, the present invention relates to safety stops that attach to the glass of a window or door with suction.

2. Prior Art Description

Young children have mobile feet and clever hands. However, young children lack judgment and life experiences that teach them to avoid danger. To limit the exposure of danger to young children, children are often kept in rooms that have been made mostly child-proof by caring parents. In this manner, a parent can leave a child unattended for short periods of time, while a parent cooks, cleans and attends to many day-to-day chores.

Although a room of a home can be made child-proof by removing certain items and blocking electrical outlets, the structure of the room cannot be readily altered. Many homes have rooms with sliding glass doors. Most homes have windows with sashes that slide up and down. In order to prevent a toddler or other child from opening a sliding door or a sliding window sash, the door or window must be kept closed and locked. This prevents doors and windows from being partially opened for the purposes of ventilation or to better hear sounds from outside the room.

A need has therefore arisen for a device that can prevent a door or window from being opened by a child, even when that door or window is already partially open. In the prior art, many devices exist that attach to the glass of sliding doors and/or window sashes and lock them in a partially open position. However, many of these products can be compromised by being installed improperly or by being touched by a child attempting to open a door or window.

In the prior art, many devices have been designed that sound an alarm when a door or window is opened beyond a certain point. Such prior art devices are exemplified by U.S. Pat. No. 5,734,324 to James and U.S. Patent Application Publication No. 2014/0009288 to Kersch. The problems associated with such prior art designs are twofold. First, the suction cups on the designs are exposed and come into direct contact with the door or window as the door or window is opened. Since the suction cups are directly contacted by the door or window, the suction cups are deformed by the contact. This often causes the suction cup to deform and break suction. Once the suction is broken, the device falls to the floor and becomes useless. Second, such prior art devices are designed as audible alarms. They produce sound only when the devices are contacted by a door or window being opened. If a child repeatedly moves a door back and forth, the device may only be contacted for a few seconds each time. The alarm produced may be so short in duration that it may go unnoticed in another room. Meanwhile, the repeated contact can easily cause the suction cups to dislodge, wherein the device becomes useless.

U.S. Pat. No. 5,552,768 to Mikiel discloses a prior art stop that attaches to a door wedge. The door wedge prevents the suction cup from being directly contacted. However, the suction cup elevates the wedge. As such, the device can only be used on doors and windows with large sliding gaps. Such door and windows are rare since homes tend to use highly energy efficient doors and windows that have very small sliding gaps. Furthermore, due to the shape of the wedge, if a door or window is engaged by the wedge, a large torque is applied to the suction cup. The torque can easily lift one edge of the suction cup and cause the suction cup to lose suction.

A need therefore exists for an improved safety product that enables a sliding door or window to be securely locked in a partially open position, wherein the safety lock is impervious to the incidental actions of a child and will not inadvertently open or fall away. This need is met by the present invention as described below.

SUMMARY OF THE INVENTION

The present invention is a safety stop device for limiting the movement of a window or sliding door that is fitted with a glass pane. The safety stop has a housing with a top plate. The top plate is flat, having a first face surface and an opposite second face surface. A hole extends through the top plate that can be accessed through either the first face surface or the second face surface. A plurality of support walls extend from the second face surface of the top plate. The support walls terminate in a common plane. A protected area is defined between the support walls and under the second face surface of the top plate.

A suction cup is disposed within the protected area. The suction cup has an apex. The suction cup is sized and positioned to engage the glass pane of a door or window when the glass pane is oriented into the common plane.

A suction control assembly is coupled to the top plate. The suction control assembly extends through the hole in the top plate and engages the suction cup proximate its apex. The suction control assembly selectively controls air pressure within the suction cup when the suction cup is engaged with the glass pane.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention safety stop can be embodied in many ways, only a few exemplary embodiments have been selected for illustration and discussion. The illustrated embodiments, however, are merely exemplary and should not be considered limitations when interpreting the scope of the claims.

Figure 1:
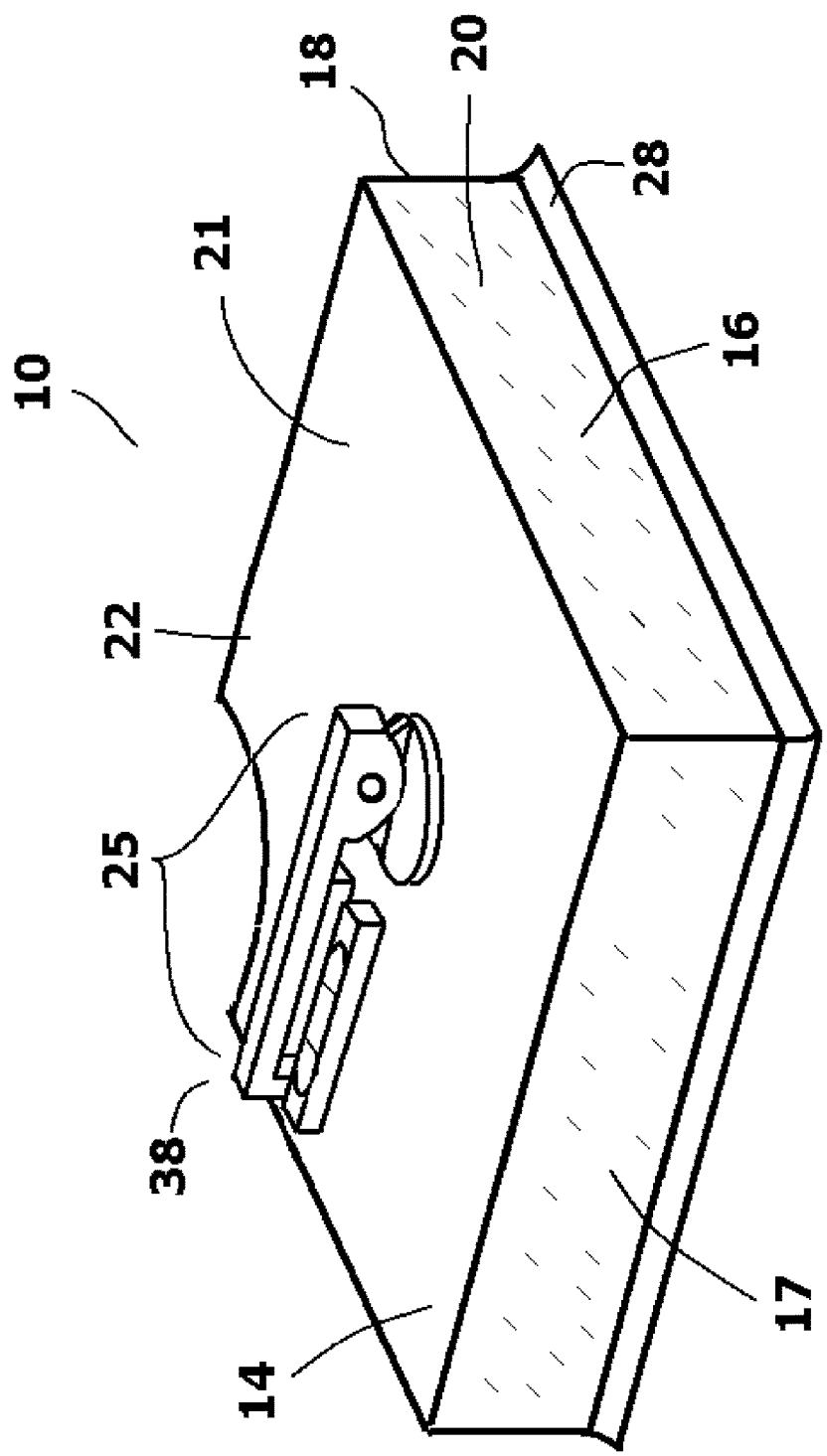
FIG. 1 is a perspective view of a first exemplary embodiment of a safety stop.
Figure 2:
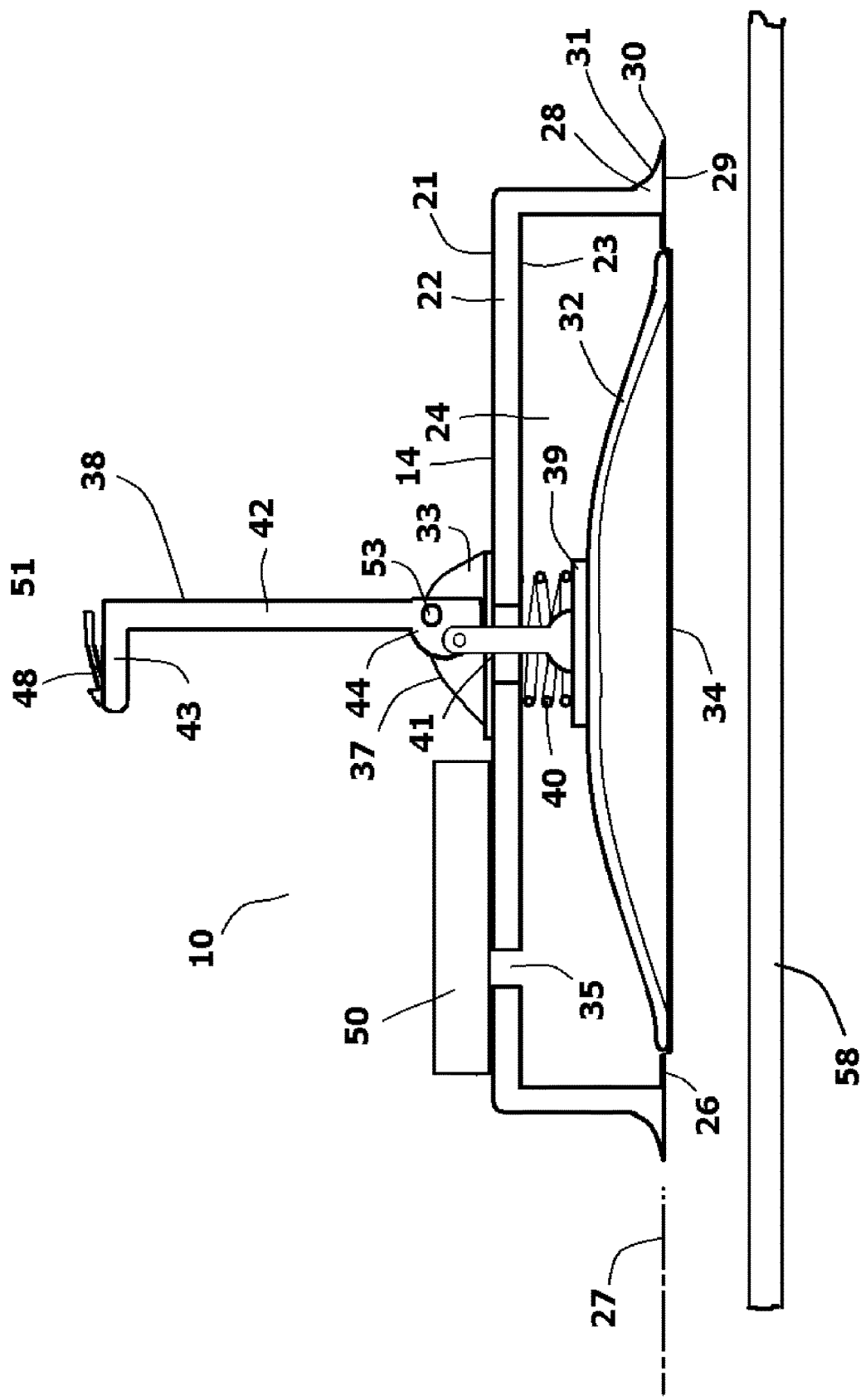
FIG. 2 is a cross sectional view of the exemplary embodiment of FIG. 1 shown in a released condition in conjunction with a pane of glass.

Referring to FIG. 1 in conjunction with FIG. 2, a safety stop 10 is shown. The safety stop 10 has a housing 14. The housing 14 has three flat peripheral contact walls 16, 17, 18. The three peripheral contact walls 16, 17, 18 are padded with elastomeric material 20 and are intended to contact moving segments of a door or window, as is later explained. The three peripheral contact walls 16, 17, 18 all interconnect to adjacent edges of a common top plate 22. The top plate 22 has two large face surfaces 21, 23. The first face surface 21 faces upwardly, away from the contact walls 16, 17, 18. The second face surface 23 faces toward the contact walls 16, 17, 18, wherein the contact walls 16, 17, 18 extend from the second face surface 23 along the periphery of the top plate 22.

The housing 14 defines an interior 24 with an open bottom 26. The open bottom 26 extends across a common plane 27 where all of the peripheral contact walls 16, 17, 18 of the housing 14 terminate. Each of the peripheral contact walls 16, 17, 18 terminates with a flange protrusion 28. The flange protrusion 28 has a flat bottom surface 29 that lies in the common plane 27 and a curved top surface 31 that extends from the common plane 27 to an elevation along a contact wall 16, 17, 18. The flange 28 has a salient edge 30 that has a thickness of greater than 0.5 millimeters.

Two openings 33, 35 are formed through the top plate 22 of the housing 14. The first opening 33 is positioned near the geometric center of the top plate 22. The second opening 35 is offset. A hinge base 37 extends upwardly from the top plate 22 of the housing 14 in a direction opposite that of the peripheral contact walls 16, 17, 18. The purpose of the two openings 33, 35 and the hinge base 37 are later explained.

A primary suction cup 32 is provided. The suction cup 32 is sized to fit within the interior 24 of the housing 14 so that the face 34 of the suction cup 32 is optimally positioned to engage any flat surface positioned in the common plane 27 at the open bottom 26 of the housing 14. The suction cup 32 is generally semicircular in shape and is made of traditional suction cup materials. The suction cup 32 curves to an apex in a traditional manner. The air pressure under the suction cup 32 is controlled by movement of the suction cup 32. The movement of the suction cup 32 is controlled by a suction control assembly 25. The suction control assembly 25 in the shown embodiment is mechanical. A rigid plate 39 is affixed to the suction cup 32 at its apex. An arm 41 extends upwardly from the rigid plate 39. The arm 41 can be either anchored to the rigid plate 39, (as shown) or attached to the rigid plate with a hinge joint.

The arm 41 extends though the first opening 33 in the top plate 22 of the housing 14. The suction control assembly 25 is manually operated using an activation handle 38. The activation handle 38 has a shaft 42 with a first end and an opposite second end. The first end of the shaft 42 terminates with a locking head 43. The locking head 43 is configured with a pawl 48 and a release 51 for the pawl 48. The second end of the shaft 42 terminates with a convex cam 44. The convex cam 44 attaches with a pivot connection 53 to the hinge base 37 above the top plate 22 of the housing 14.

A spring 40 is provided. The spring 40 is positioned around the arm 41 inside the housing 14. The spring 40 rests upon the rigid plate 39. The spring 40, therefore, is interposed between the top plate 22 of the housing 14 and the rigid plate 39 atop the suction cup 32. As a consequence, the spring 40 biases the apex of the suction cup 32 away from the top plate 22 of the housing 14.

Figure 3:
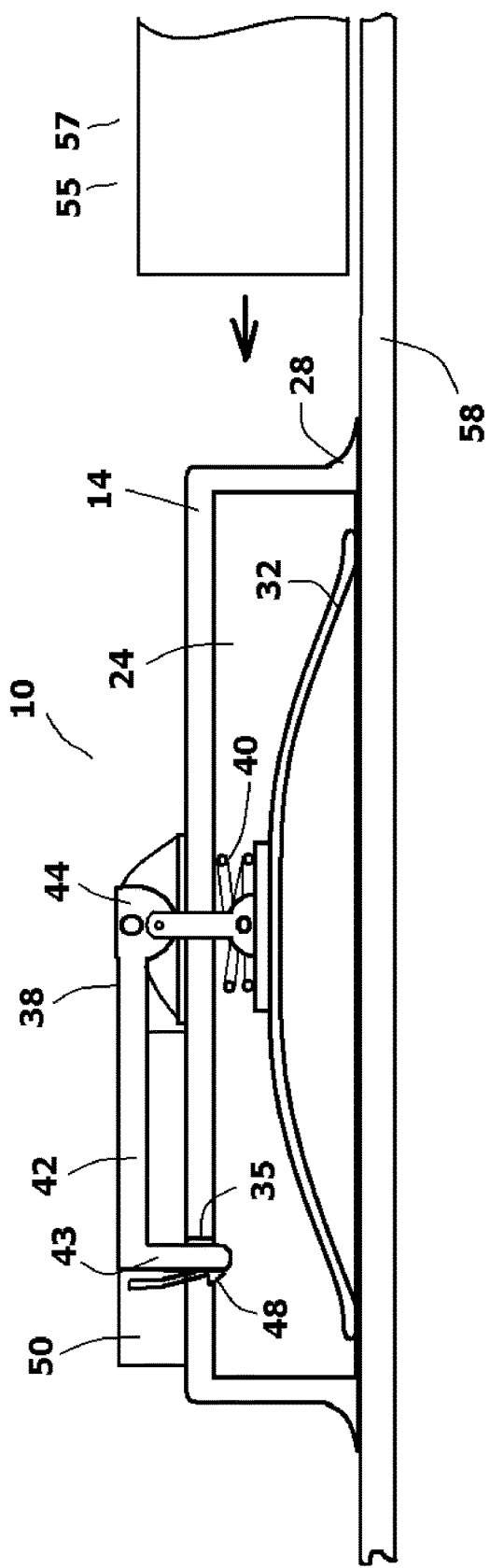
FIG. 3 is a cross sectional view of the exemplary embodiment of FIG. 1 shown in a suctioned condition in conjunction with a pane of glass.

Referring to FIG. 3 in conjunction with FIG. 1 and FIG. 2, it can be seen that the convex cam 44 at the bottom of the activation handle 38 is shaped to pull up on the arm 41 as the convex cam 44 rotates. The convex cam 44 can be rotated by rotating the shaft 42 of the activation handle 38 from a vertical orientation toward a horizontal orientation. As the convex cam 44 rotates, it causes the arm 41 to move upwardly. This, in turn, moves the rigid plate 39 upwardly. The rigid plate 39 is anchored to the suction cup 32. Thus, the suction cup 32 is moved upwardly at its apex. The upward pull acts in opposition to the spring 40. The spring 40, therefore, becomes compressed. This is the locked configuration of the safety stop 10. The locked configuration is shown in FIG. 3.

When the shaft 42 of the activation handle 38 is rotated out of its locked configuration, the convex cam 44 lowers the arm 41. The arm 41 lowers the rigid plate 39 atop the suction cup 32. This movement is assisted by the spring 40, as the spring 40 lengthens out of compression. The apex of the suction cup 32 is, therefore, biased downwardly. Once the shaft 42 of the activation handle 38 extends vertically above the top plate 22 of the housing 14, the safety stop 10 achieves its open configuration. The open configuration is shown in FIG. 2.

Two parallel projections 50, extend upwardly from the top plate 22 of the housing 14. When the safety stop 10 is moved into its locked configuration, such as is shown in FIG. 3, the shaft 42 is parallel with the top plate 22 of the housing 14. The shaft 42 of the activation handle 38 also passes between the parallel projections 50 so that the shaft 42 cannot be readily touched by a child. Furthermore, the pawl 48 at the head of the activation handle 38 engages the offset second hole 35 in the top plate 22 and locks in place. This prevents the shaft 42 from being rotated out from between the parallel projections 50 and out of the locked configuration.

A level 54 is disposed on the top plate 22 of the housing 14. In the shown embodiment, the level 54 is disposed in one of the parallel projections 50. However other locations can also be used.

Figure 4:
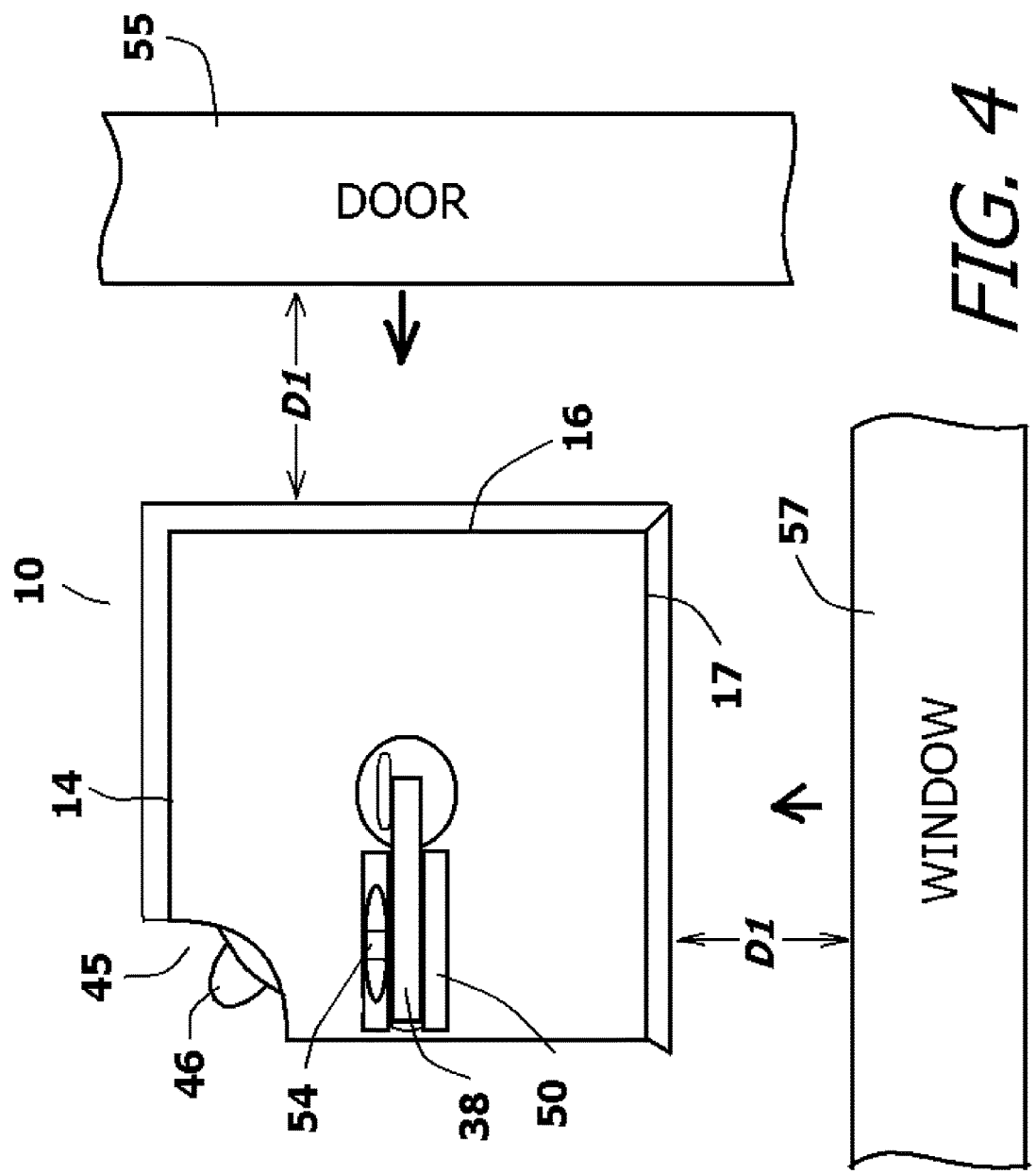
FIG. 4 is a top view of the exemplary embodiment of FIG. 1 shown in conjunction with both an approaching sliding door and an approaching sliding window.

Referring to FIG. 4 in conjunction with FIG. 1, FIG. 2 and FIG. 3, it can be seen that the safety stop 10 can be used to limit the opening of a sliding door 55 or sliding window sash 57. To use the safety stop 10, the safety stop 10 is pressed against a pane of glass 58 that is part of the sliding door 55 or the sliding window sash 57. The safety stop 10 is set at a given mounting distance D1 from the sliding door 55 or the sliding window sash 57 when closed. This will limit the opening movement of the sliding door 55 or the sliding window sash 57 to a distance equal to the mounting distance D1.

In FIG. 4 it can also be seen that the housing 14 may include a cutaway 45 that exposes a section of the suction cup 32. A tab 46 is coupled to the suction cup 32 under the cutaway 45 so that the tab 46 can be manually lifted to disengage the suction cup 32 from a surface.

Referring to FIG. 2, FIG. 3 and FIG. 4, it will be understood that the safety stop 10 is installed by pressing the housing 14 and suction cup 32 against the pane of glass 58 while the safety stop 10 is in its open configuration. The activation handle 38 is then rotated downward in between the parallel projections 50. This alters the safety stop 10 to its closed configuration. This deflects the suction cup 32 and creates a negative pressure between the suction cup 32 and the pane of glass 58. The pawl 48 on the activation handle 38 is engaged with the offset second opening 35 in the top plate 22 of the housing 14. In this manner, no small child can grab the activation handle 38 and change the safety stop 10 to its open configuration.

Once the suction cup 32 is firmly adhered to the pane of glass 58, the housing 14 is rotated until the level 54 indicates that it is in the horizontal. This aligns the first contact wall 16 of the housing 14 with the edge of the vertical sliding door 55 or the second contact wall 17 with the sliding window sash 57. In this manner, when the sliding door 55 or sliding window sash 57 contacts the safety stop 10, the contact is flush against one of the peripheral contact walls 16, 17, 18. This prevents contact from the sliding door 55 or sliding window sash 57 from turning or twisting the housing 14.

Figure 5:
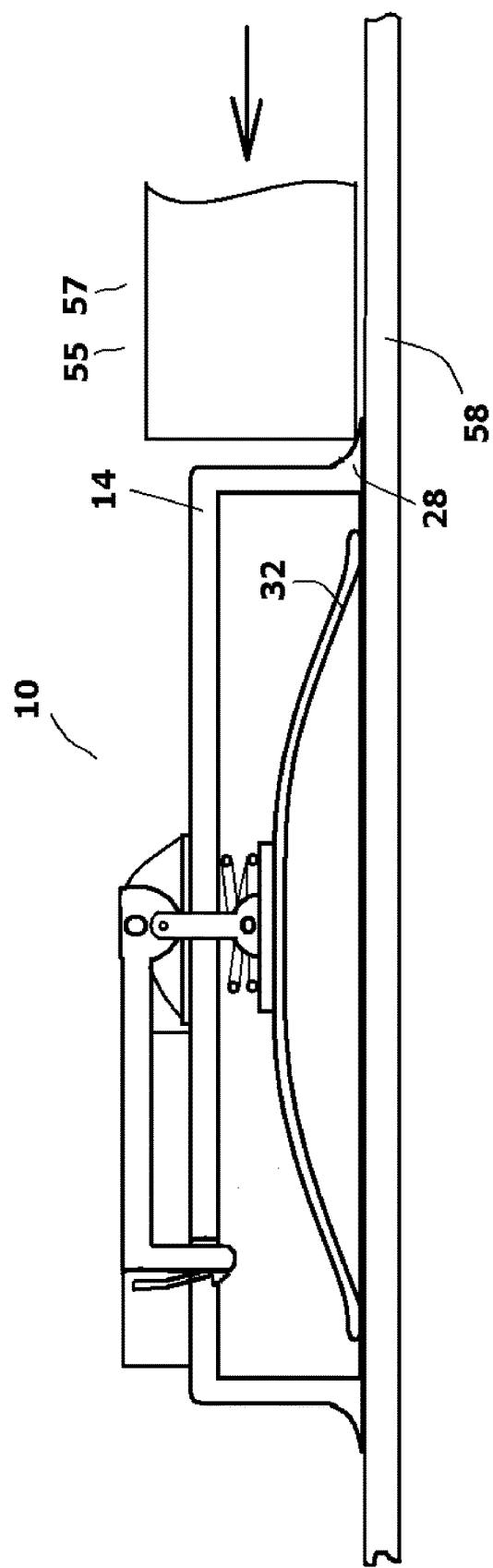
FIG. 5 is a side view of the exemplary embodiment of FIG. 1 shown in conjunction with an approaching sliding door or window at the moment of contact.

Referring to FIG. 5, it will be understood that as the sliding door 55 or sliding window sash 57 comes into contact with the housing 14, the thin flange protrusion 28 at the bottom of the housing 14 becomes wedged under the approaching sliding door 55 or sliding window sash 57. This biases the housing 14 of the safety stop 10 toward the pane of glass 58 and helps prevent the contact from moving the safety stop 10 laterally along the pane of glass 58.

Figure 6:
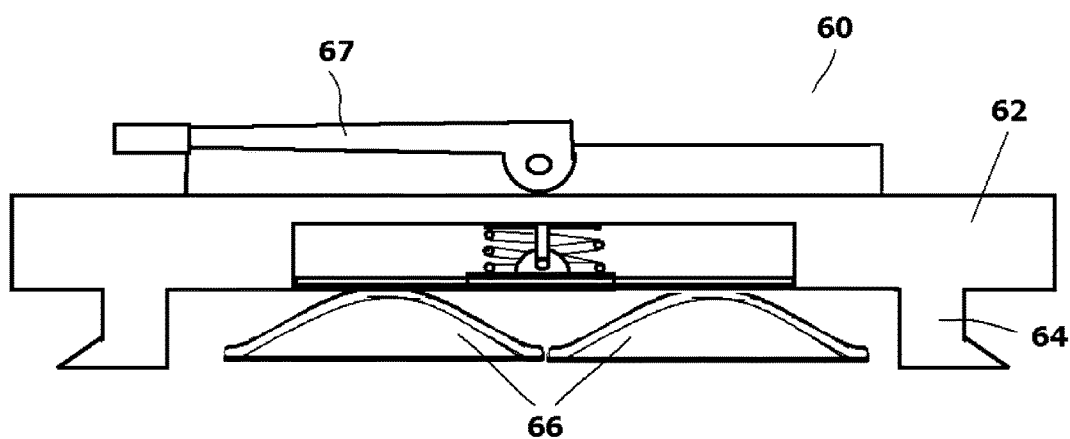
FIG. 6 is a cross-sectional side view of a second exemplary embodiment of the invention.
Figure 7:
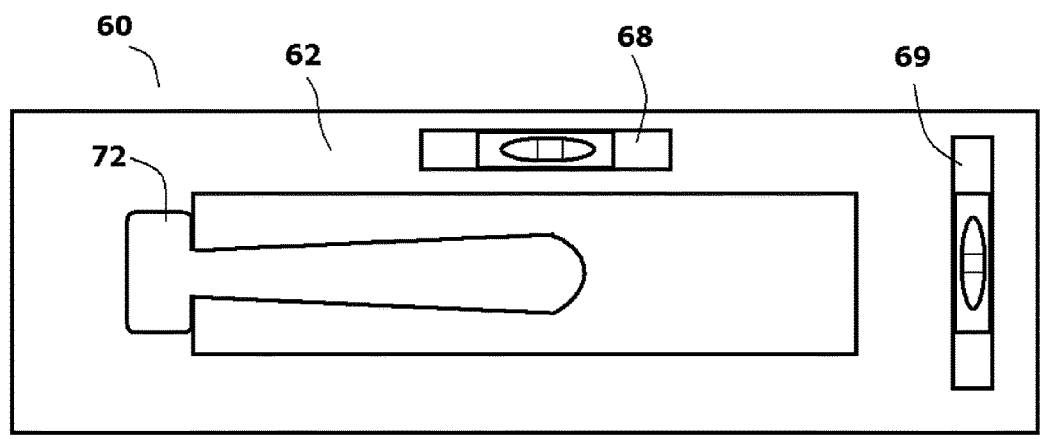
FIG. 7 is a top view of the embodiment of the present invention shown in FIG. 6.

Referring to FIG. 6 and FIG. 7, an alternate embodiment of a safety stop 60 is shown. In this embodiment, the safety stop 60 has an enlarged top plate 62 that is supported at an elevation by support walls 64. The support walls 64 surround a plurality of suction cups 66. The top plate 62 extends beyond the support wall 64 in every direction. As such, the top plate 62 will contact any sliding door or window before it contacts a support wall 64. This shields the support walls 64 and the suction cups 66 they surround. In this manner, even if a door or window is opened with great force, it will not act to deform all of the suction cups 66 and make one or more lose suction.

In the embodiment of FIG. 6 and FIG. 7, it can be seen that the safety stop 60 can be provided with two levels 68, 69. In this manner, the safety stop 60 can be aligned in both the vertical and horizontal. This will ensure that the safety stop 60 is properly oriented and is contacted flush by a door or window.

Lastly, in FIG. 6 and FIG. 7, it can be seen that the activation handle 67 can be made bidirectional so that it can be locked in either of two opposite directions. This improves the ergonomics of the safety stop 60.

Figure 8:
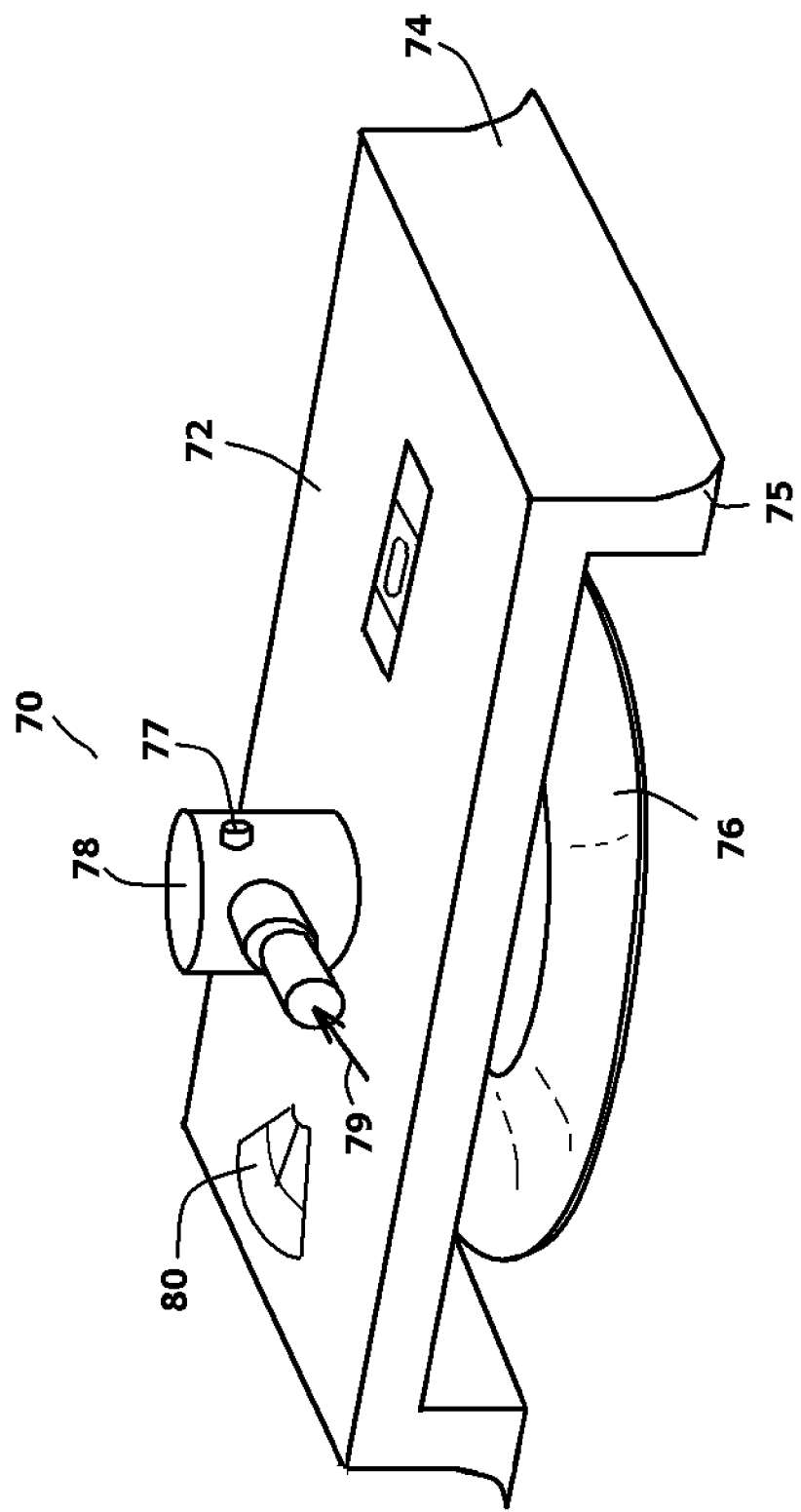
FIG. 8 is a perspective view of a third exemplary embodiment of the present invention.

Referring to FIG. 8, another alternate embodiment of a safety stop 70 is shown. In this embodiment, the safety stop 70 has an enlarged top plate 72 that is supported at an elevation by contact walls 74. The contact walls 74 have flange protrusions 75 such as those described in the embodiments of FIG. 1 through FIG. 5. The contact walls 74 surround two opposing sides of a large central suction cup 76. The suction control assembly is a finger pump 78 that extends upwardly through the top plate 72. The finger pump 78 is repeatedly squeezed in the direction of arrow 75. As the finger pump 78 is squeezed, it draws air from within the confines of the suction cup 76. This causes the suction cup 76 to adhere to any smooth flat surface that it is pressed against.

A vent release 79 can be provided on the finger pump 72 to enable air to be selectively vented into the suction cup 76 to cause the suction cup 76 to release. The safety stop 70 also can contain a pressure gauge 80 so that the level of suction created within the suction cup 76 can be visualized. It will also provide a visual indication that would inform of any air leak that may cause the suction cup 76 to inadvertently detach.

Figure 9:
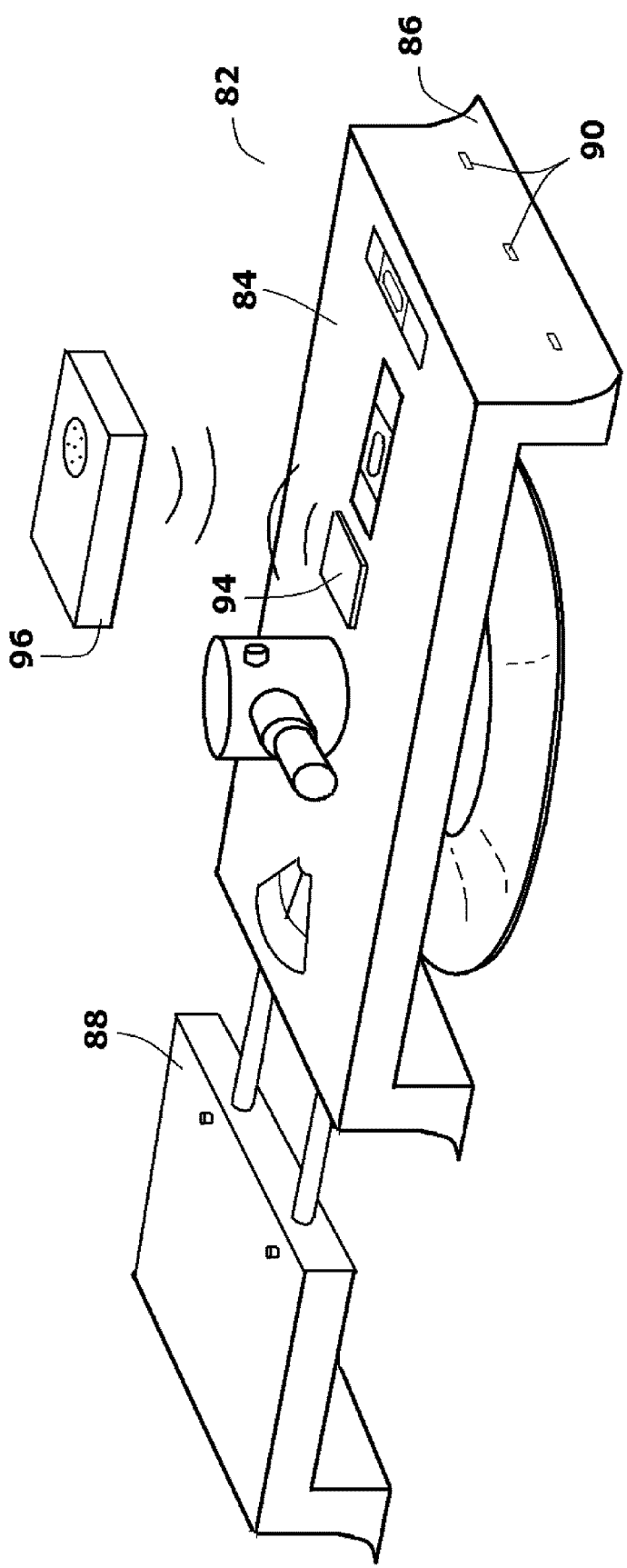
FIG. 9 is a perspective view of a fourth exemplary embodiment of the present invention.

Referring to FIG. 9, another alternate embodiment of a safety stop 82 is shown. In this embodiment, the safety stop 82 has an enlarged top plate 84 that is supported at an elevation by contact walls 86. The safety stop 80 also includes an extension 88 that extends from the enlarged plate 84, therein effectively providing the enlarged plate 84 with an adjustable length. This feature is useful with certain brands of windows and doors that have long overlaps in pane of glass.

The safety stop 82 also includes sensors 90 and an electronic controller 94. The sensors 90 detect when the contact walls 86 are touched by a window or door. The sensors 90 communicate with the electronic controller 94. The electronic controller 94 can sound an audible alarm or can transmit a signal to a portable alarm 96 that is carried by a user at a remote location.

In all described embodiments, a safety stop is provided that attaches to a glass door or a window using suction. The safety stop is designed to prevent physical contact between the window/door and the suction cups being utilized. The safety stop is also designed to utilize the contact of a window or door to further seat the suction cups of the safety stop, rather than displace the suction cups. The result is a safety stop that cannot be easily displaced by a child attempting to open a window or door.

It will be understood that the embodiments of the present invention that are illustrated and described are merely exemplary and that a person skilled in the art can make many variations to those embodiments. Elements of different embodiments can be mixed and matched. All such embodiments are intended to be included within the scope of the present invention as defined by the claims.

What is claimed is:

1. A safety stop device for limiting movement of a window or door having a glass pane, said device comprising:
a housing having a top plate with a first face surface, an opposite second face surface, and a first hole that extends through said top plate through said first face surface and said second face surface, wherein support walls extend from said second face surface and terminate in a common plane, and wherein a protected area is defined between said second face surface and said common plane within said support walls;
a suction cup disposed within said protected area, wherein said suction cup has an apex and is sized and positioned to engage the glass pane when brought into said common plane;
a suction control assembly extending from said first face surface of said top plate, wherein said suction control assembly extends through said hole in said top plate and engages said suction cup proximate said apex, wherein said suction control assembly selectively controls air pressure within said suction cup when engaged.

2. The device according to claim 1, wherein said top plate has peripheral edges and said support walls extend from said top plate at said peripheral edges.

3. The device according to claim 2, wherein a layer of elastomeric material is coupled to at least some of said support walls.

4. The device according to claim 1, wherein each of said support walls has a first end coupled to said top plate and a second end that terminates at said common plane, wherein a flange protrusion extends from at least some of said support walls at said second end.

5. The device according to claim 4, wherein said flange has a flat surface that extends from one of said support walls in said common plane to a salient edge, and a curved surface that extends back from said salient edge.

6. The device according to claim 1, wherein said suction control assembly includes a rigid plate that is coupled to said suction cup at said apex.

7. The device according to claim 6, wherein said suction control assembly further includes an arm, that extends from said rigid plate through said hole.

8. The device according to claim 1, wherein said suction control assembly further includes an activation handle for selectively moving said arm through said hole.

9. The device according to claim 8, wherein said activation handle terminates with a locking head that can be selectively locked to said top plate.

10. The device according to claim 8, further including a projection extending from said first face surface of said top plate that inhibits physical access to said activation handle when said activation handle is oriented parallel to said top plate.

11. The device according to claim 1, wherein said suction control assembly includes a manual suction pump.

12. The device according to claim 1, further including an air pressure gauge that indicates air pressure within said suction cup.

13. The device according to claim 1, further including at least one level coupled to said top plate.

14. The device according to claim 1, wherein said top plate has peripheral edges and said support walls extend from said top plate at positions inset to said peripheral edges.

15. A safety stop device for limiting movement of a window or door having a glass pane, said device comprising:
   a top plate having a hole formed therethrough;
   support walls extending from said top plate in a common direction and terminating in a common plane;
   at least one suction cup disposed within said support walls, wherein said at least one suction cup is sized and positioned to engage the glass pane when brought into said common plane;
   a suction control assembly mounted to said top plate, wherein said suction control assembly selectively controls air pressure within said at least one suction cup.

16. The device according to claim 15, wherein said top plate has peripheral edges and said support walls extend from said top plate at said peripheral edges.

17. The device according to claim 16, wherein each of said support walls has a first end coupled to said top plate and a second end that terminates at said common plane, wherein a flange protrusion extends from at least some of said support walls at said second end.

18. The device according to claim 17, wherein each said flange protrusion has a flat surface that extends from said support wall in said common plane to a salient edge and a curved surface that extends back from said salient edge.

19. The device according to claim 16, wherein a layer of elastomeric material is coupled to at least some of said support walls.

20. The device according to claim 16, further including at least one level coupled to said top plate.

* * * * *